(12) United States Patent
Oldenettel et al.

(10) Patent No.: US 6,463,799 B1
(45) Date of Patent: Oct. 15, 2002

(54) MOTOR VEHICLE HAVING A CONTROL SYSTEM FOR CONTROLLING TIRE PRESSURE

(75) Inventors: Holger Oldenettel, Garbsen; Wolfgang Klodmann, Nienburg; Holger Behrends, Hannover, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/546,369

(22) Filed: Apr. 10, 2000

(30) Foreign Application Priority Data

Apr. 9, 1999 (DE) .......................................... 199 15 999

(51) Int. Cl.⁷ .............................................. B60C 23/02
(52) U.S. Cl. ...................................... 73/146.5; 340/445
(58) Field of Search ............................. 73/146, 146.2, 73/146.5, 146.8, 146.4; 340/442, 58

(56) References Cited

U.S. PATENT DOCUMENTS

| | | | | |
|---|---|---|---|---|
| 3,694,803 A | * | 9/1972 | Strenglein | 340/58 |
| 5,552,759 A | * | 9/1996 | Stoyka | 340/426 |
| 5,569,848 A | * | 10/1996 | Sharp | 73/146.2 |
| 5,602,540 A | * | 2/1997 | Spillman, Jr. | 340/870.37 |
| 5,808,190 A | | 9/1998 | Ernst | 73/146.5 |
| 5,883,305 A | * | 3/1999 | Jo et al. | 73/146.5 |
| 6,112,587 A | * | 9/2000 | Oldenettel | 73/146.5 |
| 6,137,400 A | * | 10/2000 | Yanase et al. | 340/442 |

FOREIGN PATENT DOCUMENTS

| | | |
|---|---|---|
| DE | 2621452 | 11/1976 |
| DE | 4205911 | 9/1993 |
| DE | 196 52 365 | 4/1998 |

\* cited by examiner

*Primary Examiner*—Harshad Patel
(74) *Attorney, Agent, or Firm*—Walter Ottesen

(57) ABSTRACT

The invention relates to a motor vehicle having a tire-pressure control system wherein pressure values in the tires are measured by respective tire-pressure control devices (4a to 4d) and are transmitted from these devices via a central antenna (6) to a central unit (10). The central antenna is mounted beneath the vehicle on an electrically-insulating surface. The antenna is preferably mounted on the surface of a fuel tank made of electrically-insulating material. With an arrangement of the central antenna (6) as described above, excellent reception of the data transmitted by the tire-pressure control devices (4a to 4d) is ensured.

26 Claims, 3 Drawing Sheets

MOTOR VEHICLE HAVING A CONTROL SYSTEM FOR CONTROLLING TIRE PRESSURE

FIELD OF THE INVENTION

The invention relates to a motor vehicle having a control system for tire pressure. This control system includes the following components: at least one tire-pressure control device assigned to each tire of the motor vehicle with which the air pressure of the corresponding tire can be measured; a central control unit to which each tire-pressure control device contactlessly transmits data containing at least information as to the air pressure of the tire to which the tire-pressure control device is assigned; and, a central antenna for receiving the data transmitted by the tire-pressure control devices with this central antenna being connected to the central unit.

BACKGROUND OF THE INVENTION

German patent publication 4,205,911 discloses a motor vehicle having a tire-pressure control system which includes a tire-pressure control device at each wheel of the vehicle. The tire pressure of the corresponding wheel is measured with the tire-pressure control device. Each tire-pressure control device transmits the measured value at time intervals from the wheel to the motor vehicle. The vehicle includes a receiving antenna in each wheel house to receive the transmitted data. The data, which are received by a receiver antenna, are transmitted to a central unit and are there evaluated. A warning is given to the driver of the motor vehicle when the measured air pressure at a wheel position deviates from a pregiven air pressure by a pregiven amount.

In the tire-pressure control system known from German patent publication 4,205,911, a good reception of the data transmitted by the tire-pressure control devices is ensured because a receiver antenna is disposed in the immediate vicinity of each tire-pressure control device. The tire-pressure control system known from the above publication has, however, the disadvantage that it incurs high manufacturing costs because each wheel house of the vehicle contains a receiver antenna whose acquisition and placement is expensive.

U.S. Pat. No. 5,808,190 is incorporated herein by reference and discloses a tire-pressure control system for a motor vehicle which includes the following components: at least one tire-pressure control device assigned to each tire of the motor vehicle with which the air pressure of the corresponding tire can be measured; a central control unit to which each tire-pressure control device contactlessly transmits data containing at least information as to the air pressure of the tire to which the tire-pressure control device is assigned; and, a central antenna for receiving the data transmitted by the tire-pressure control devices with this central antenna being connected to the central unit.

In the tire-pressure control system disclosed in U.S. Pat. No. 5,808,190, a pressure-control device is provided at each wheel of the motor vehicle with which the air pressure in the corresponding tire is measured. Each tire-pressure control device transmits the measured air pressure to the motor vehicle at time intervals. The motor vehicle has exactly one central antenna to receive the transmitted data. The received data are transmitted by the central antenna to a central unit and are there evaluated as explained above.

The tire-pressure control system disclosed in U.S. Pat. No. 5,808,190 brings about a low cost in the manufacture thereof because it includes only one central antenna. This antenna can be placed in the motor vehicle and connected to the central unit with little effort. The high-frequency signal transmitted by a tire-pressure control device, however, changes continuously because of the rotation of the wheel and the tire-pressure control devices have only a slight transmitting capacity. For this reason, a disturbance-free reception of the data, which are transmitted by the tire-pressure control devices, can be obtained with one central antenna only with difficulty. This publication provides no information as to how the central antenna could be configured in order to ensure a reliable reception of the data.

SUMMARY OF THE INVENTION

It is an object of the invention to provide a tire-pressure control system with tire-pressure control devices which transmit data which can be received by a central antenna of the tire-pressure control system wherein a good reception of the data by the central antenna is ensured.

The motor vehicle of the invention has a tire-pressure control system and includes: a part on the lower side of the vehicle and the part including a surface defined by an electrically insulating material; a plurality of tires; a plurality of tire-pressure control devices corresponding to respective ones of the tires for measuring the respective air pressures therein; a central unit; each one of the tire-pressure control devices being adapted to contactlessly transmit data to the central unit and the data containing at least information as to the air pressure in the tire corresponding to the one of the tire-pressure control devices; a central antenna for receiving the data transmitted by the tire-pressure control devices; and, the central antenna being connected to the central unit and being mounted on the surface.

The advantages achieved with the invention are especially that the central antenna can be well matched or tuned to the reception of the frequency or wavelength of the high-frequency signal with which the tire-pressure control devices transmit. The tuning undertaken is not affected by the base on which the central antenna is located because this base is made of an electrically-insulating material. A good reception of the data, which is transmitted by the tire-pressure control devices, is ensured because of the excellent tuning of the central antenna.

A further advantage of the invention is that a direct transmission path from the tire-pressure control device to the central antenna is ensured because of the arrangement of the central antenna beneath the vehicle at a great many angular positions of each wheel (that is, always when the wheel assumes an angular position wherein the tire-pressure control device is located outside of the wheel housing). A transmission path is provided wherein no disturbing obstructions are located for the transmitted high-frequency signal between the tire-pressure control device and the central antenna. In this way too, excellent reception of the data, which is transmitted by the tire-pressure control devices, is ensured. Still another advantage of the invention is that the tire-pressure control system can be manufactured at advantageous cost because it has only one central antenna.

According to another feature of the invention, the central antenna is mounted on a fuel tank of the motor vehicle and this fuel tank is made of electrically-insulating material. The advantage of this embodiment is that modern motor vehicles anyhow have a fuel tank made of electrically-insulating plastic whose surface is, in part, disposed below the motor vehicle so that no separate electrically-insulating surface must be made available for the central antenna. In this way, the cost of the tire-pressure control system can be still further reduced. Preferably, the central antenna is mounted on that part of the fuel tank which has the shortest spacing to the ground on which the motor vehicle stands.

According to another feature of the invention, the central antenna is impressed, utilizing an electrically-conducting material, onto an electrically-insulating foil which is attached to the electrically-insulating surface, that is, onto the fuel tank. The advantage of this embodiment is that electrically-insulating foils, onto which a central antenna is impressed, i s cost effective in manufacture. Preferably, the foil is placed on t he electrically-insulating surface or fuel tank utilizing adhesive. Preferably, the impressed central antenna is laid directly on the insulating surface or fuel tank so that it is embedded for protection against mechanical loads between the electrically-insulating surface or fuel tank and the electrically-insulating foil. In this case, an electrically-insulating adhesive is used.

According to still another feature of the invention, the central antenna is surround ed on all sides by the electrically-insulating material of the insulating surface or fuel tank. The advantage of this embodiment is that the central antenna is especially well protected against mechanical loads, for example, those loads which are caused by an impacting stone, et cetera.

In the following it will be explained how a fuel tank made of electrically-insulating material is produced with an embedded central antenna.

First, the tank is produced in a casting process, such as injection molding, with the tank being produced, for the most part, from a plastic which cannot be galvanized. Only the surface is excepted on which the central antenna is intended to lie. This surface is produced in a second process step likewise in a casting process from a plastic which can be galvanized. This casting process can, for example, be an injection molding process. Thereafter, the fuel tank is placed in a galvanizing bath so that metal deposits on the galvanizable surface and thereby the central antenna is formed on the surface of the fuel tank. Thereafter, the surface of the fuel tank on which the central antenna lies, is encased with an additional electrically-insulating plastic layer in a casting process such as an injection-molding process. The process explained here is known as a molded interconnected process and is known per se. This process is also referred to as the MID process.

According to still another feature of the invention, the central antenna is connected to the central unit via a cable, which is suitable for high frequencies, such as a coaxial cable or a twisted-pair cable. The use of a coaxial cable affords the advantage that the data, which are received by the central antenna, can be transmitted to the central unit almost loss free. The use of a twisted-pair cable affords the advantage that such a cable is especially cost effective. The twisted-pair cable is a cable which comprises two electrically-conducting individual leads which are jacketed with an electrically insulating layer and are twisted with each other.

According to still another feature of the invention, each point of the central antenna is at a distance to the neighboring electrically-conductive components of the motor vehicle (such as the chassis and the bottom sheet metal), which distance is at least one quarter of the wavelength of the high frequency signal with which the data from the tire-pressure control devices are transmitted to the central unit. The advantage of this embodiment is that the central antenna is not mismatched or detuned by neighboring electrically-conductive components of the motor vehicle. Preferably, the distance is at least half of the wavelength of the high-frequency signal with which the data are transmitted from the tire-pressure control device to the central unit.

According to another embodiment of the invention, the central antenna has the form of a dipole antenna wherein each arm is bent at least at one point. This embodiment affords the advantage that a dipole antenna configured in this manner can be accommodated on the surface of the fuel tank made of electrically-insulating material without a large requirement as to space. In this way, the above-mentioned distances to the neighboring electrically-conducting components of the chassis can be maintained without difficulties.

According to another embodiment of the invention, at least one additional central antenna is arranged on the surface of the fuel tank in addition to the first central antenna. This additional central antenna is connected to the central unit. The connection of the additional central antenna to the central unit can be made in the same way as the connection of the first central antenna to this unit (as explained above). The advantage of this embodiment is that a still greater improvement of the reception of the data, which are transmitted from the tire-pressure control devices, can be ensured with the additional central antenna.

According to another feature of the invention, each point of the additional central antenna is at a distance to each point of the first central antenna which amounts to at least one quarter of the wavelength of the high frequency signal with which the data are transmitted from the tire-pressure control devices to the central unit. Preferably, the above-mentioned distance amounts to at least half the wavelength. The advantage of this embodiment is that the first central antenna and the additional central antenna do not affect each other in a negative manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
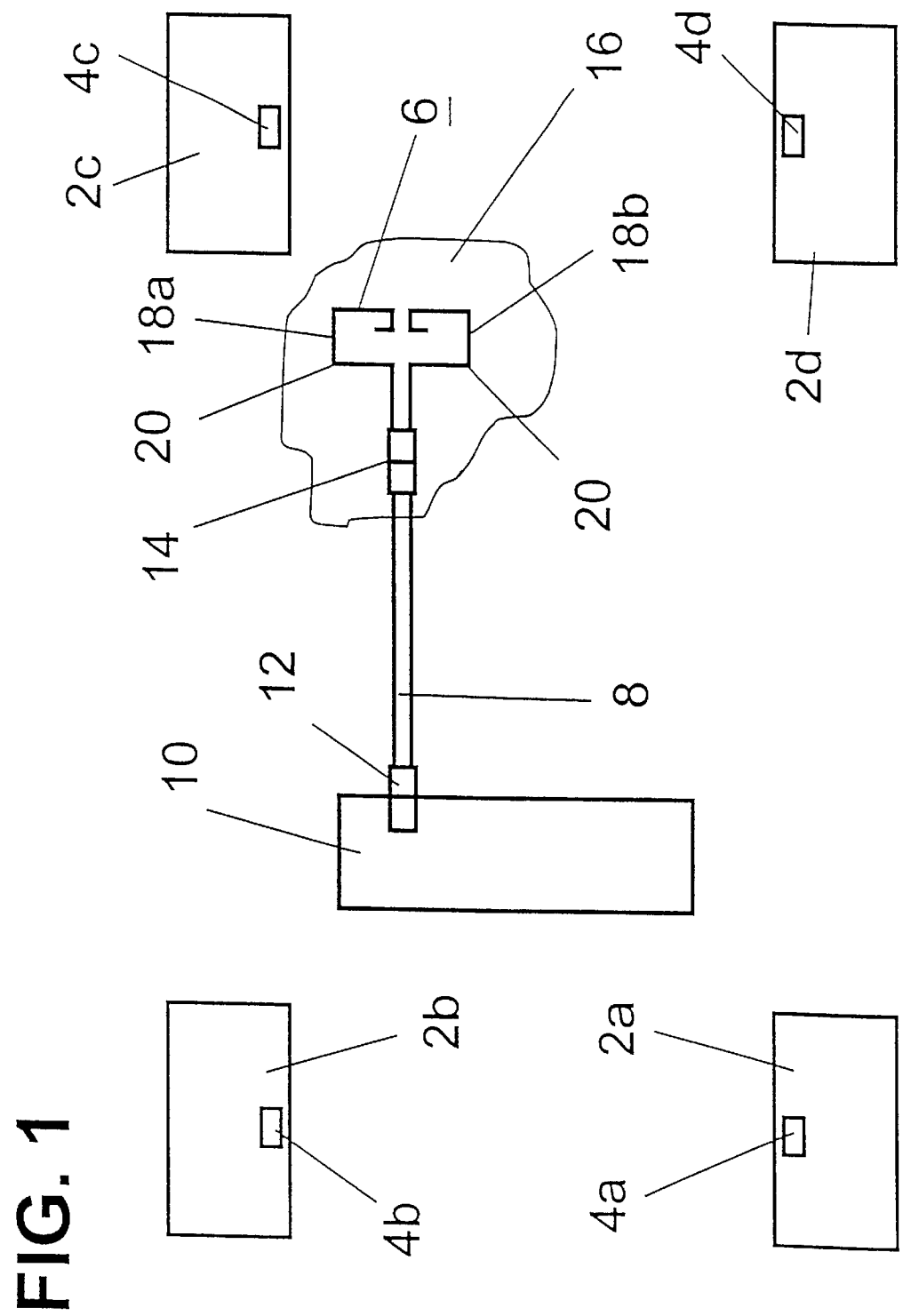
FIG. 1 is a schematic of a motor vehicle having a tire-pressure control system according to an embodiment of the invention.

FIG. 1 shows a schematic representation of a motor vehicle equipped with a tire-pressure control system. The tire-pressure control system includes tire-pressure control devices (4a to 4d) at corresponding ones of the wheels (2a to 2d) of the motor vehicle for measuring the air pressure in the corresponding tire. Each of the tire-pressure control devices (4a to 4d) transmits a high frequency signal to the motor vehicle at time intervals and this high frequency signal contains at least the measured pressure of the tire. Preferably, all high-frequency signals have the same frequency or wavelength. The high-frequency signals are received by a central antenna 6 and are transmitted from there to the central unit 10 via a cable 8 suitable for high frequencies. The cable 8 is preferably in the form of a coaxial cable or in the form of a twisted pair cable. The transmitted data are evaluated at the central unit 10 in a manner known per se and a warning is sent to the driver of the motor vehicle when the air pressure in one of the tires of the motor vehicle deviates from a pregiven value by a pregiven amount.

The cable 8 is connected to the central antenna 6 as well as to the central unit 10 via respective plugs 12 and 14.

The central antenna 6 is mounted below the vehicle on a surface defined by electrically-insulating material. Preferably, the antenna is mounted on the surface of the fuel tank 16 of the motor vehicle as close as possible to the ground on which the motor vehicle stands (only a detail cutout is shown in FIG. 1). The fuel tank 16 is made of electrically-insulating plastic in modern motor vehicles.

The central antenna 6 has the form of a dipole antenna wherein each arm (18a, 18b) is bent at at least one point 20 and preferably at several points so that each arm (18a, 18b) has the form of a "cornered spiral" as shown in FIG. 1. Each point of the central antenna 6 is at a distance to neighboring electrically-conductive components of the motor vehicle, which distance is at least one quarter of the wavelength of the high frequency signal with which the data are transmitted from the tire-pressure control devices (4a to 4d) to the central unit 10.

Figure 2:
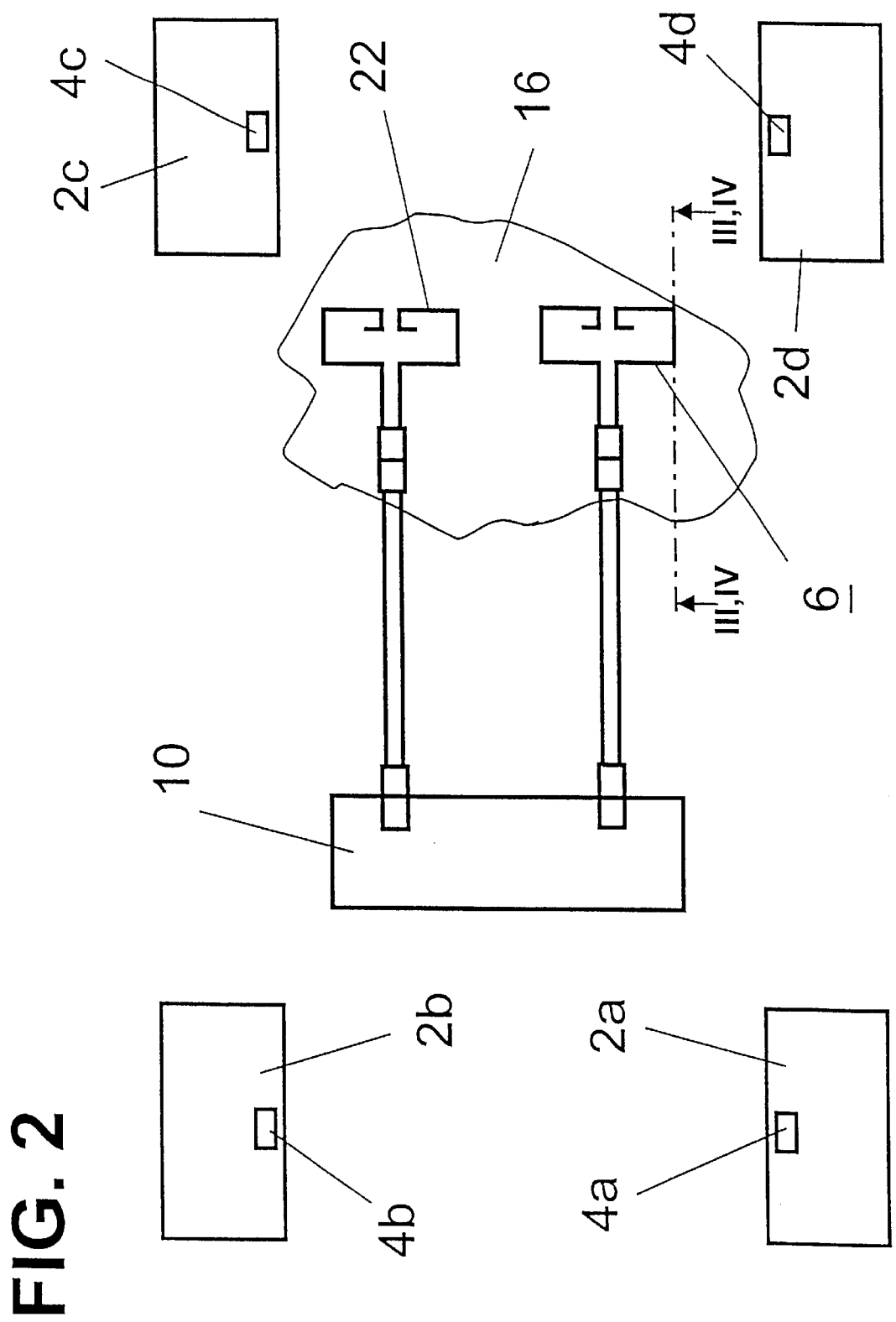
FIG. 2 is a schematic of a motor vehicle having a tire-pressure control system according to another embodiment of the invention.

FIG. 2 shows a motor vehicle having a tire-pressure control system which is built up essentially in the same way as the control system shown in FIG. 1. The single difference is that a further antenna 22 is mounted on the fuel tank 16 of the motor vehicle next to the central antenna 6. This additional antenna 22 preferably has the same form and is applied to the fuel tank 16 in the same way as the central antenna 6. The additional antenna 22 is likewise connected via a high frequency cable to the central unit 10 and ends in a plug on the side of the central unit 10 as well as ending with a plug on the side of the fuel tank 16. The high frequency cable is preferably in the form of a coaxial cable or a twisted-pair cable. Each point of the additional antenna 22 is at a spacing to each point of the central antenna 6 and to the neighboring electrically conductive components of the motor vehicle and this spacing is at least one quarter of the wavelength of the high frequency signal with which the data are transmitted from the tire-pressure control devices (4a to 4d) to the central unit 10 so that a detuning of the two antennas is substantially precluded.

Figure 3:
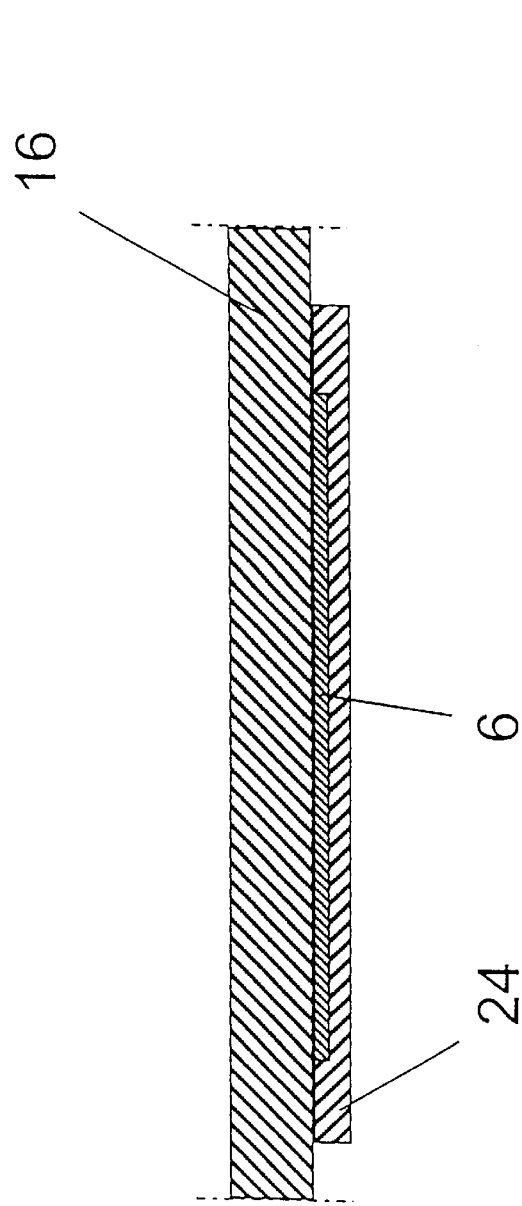
FIG. 3 is a section view taken along line III—III of FIG. 2 for the situation wherein a fuel tank is provided on which an electrically-insulating foil is attached by means of an electrically-insulating adhesive; and, FIG. 4 is a section view taken along line IV—IV of FIG. 3 for the situation wherein the motor vehicle is provided with a fuel tank comprising two electrically-insulating plastic layers.

FIG. 3 shows a breakout of a cross section along the line III—III of FIG. 2 taken through a fuel tank 16 on which an electrically-insulating foil is applied by means of an electrically-insulating adhesive. The central antenna 6 is impressed upon the foil 24 with the aid of an electrically-conducting material. The foil 24 is secured with adhesive in such a manner to the surface of the fuel tank 16 that the central antenna 6 is embedded between the fuel tank 16 and the foil 24 as protection against impacting stones.

Figure 4:
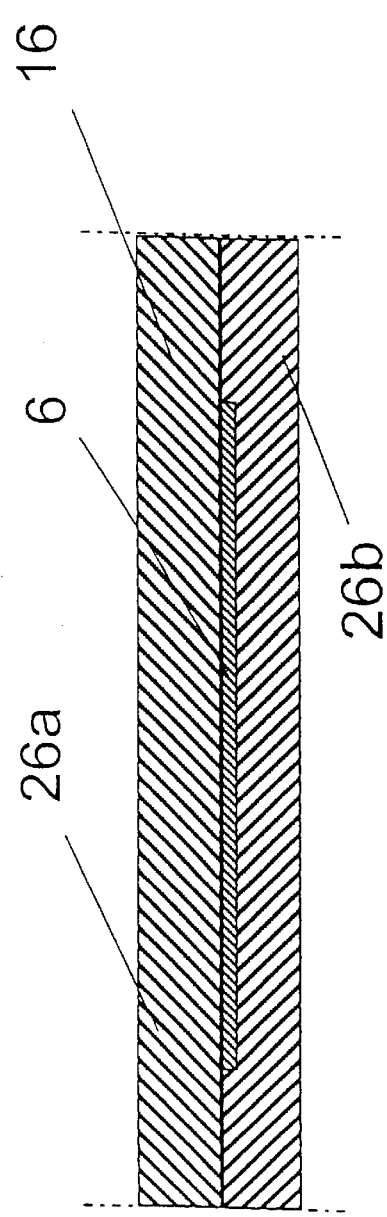

FIG. 4 shows a detail section along line IV—IV of FIG. 2 through a fuel tank 16 which comprises two electrically-insulating plastic layers 26a and 26b. The central antenna 6 is embedded between the two plastic layers to protect against impacting stones and the like.

In FIGS. 1 to 4, dipole antennas are used. These antennas afford the advantage that they do not have to be connected to a grounded base plate in order to fulfill their function. Accordingly, these antennas can be mounted easily on the surface of an electrically-insulating material. However, the invention is not limited to the application of dipole antennas; rather, all other configurations of antennas can be used which are then connected to grounded metal parts in the immediate vicinity such as the chassis.

It is understood that the foregoing description is that of the preferred embodiments of the invention and that various changes and modifications may be made thereto without departing from the spirit and scope of the invention as defined in the appended claims.

What is claimed is:

1. A motor vehicle having a tire-pressure control system, the motor vehicle comprising:

a part on the lower side of said vehicle and said part including a surface defined by an electrically insulating material;

a plurality of tires;

a plurality of tire-pressure control devices corresponding to respective ones of said tires for measuring the respective air pressures therein;

a central unit;

each one of said tire-pressure control devices functioning to contactlessly transmit data to said central unit and said data containing at least information as to the air pressure in the tire corresponding to said one of said tire-pressure control devices;

a central antenna for receiving the data transmitted by said tire-pressure control devices;

said central antenna being connected to said central unit and being mounted on said surface; and, said part being a fuel tank made of said electrically insulating material and said central antenna being mounted on said fuel tank.

2. The motor vehicle of claim 1, further comprising an electrically insulating foil; said central antenna being defined by an electrically conductive material impressed on said foil; and, said foil being attached to said surface.

3. The motor vehicle of claim 2, wherein said part is a fuel tank made of said electrically insulating material.

4. The motor vehicle of claim 1, said central antenna being surrounded by said electrically insulating material on all sides thereof.

5. The motor vehicle of claim 1, said central antenna being connected to said central unit by a high frequency cable.

6. The motor vehicle of claim 5, said high frequency cable being a coaxial cable.

7. The motor vehicle of claim 5, said high frequency cable being a twisted-pair cable.

8. The motor vehicle of claim 1, each one of said tire-pressure control devices functioning to transmit said data to said central antenna as a high frequency signal; said part being a first part and said motor vehicle further comprising a plurality of additional parts made of electrically conductive material arranged adjacent to said first part; and, said central antenna being mounted on said first part so as to cause every point thereof to be at a distance from said additional parts which corresponds to at least a quarter wavelength of said high frequency signal.

9. The motor vehicle of claim 1, said central antenna being a dipole antenna having two arms and each of said arms being sharply bent at at least one point thereof.

10. The motor vehicle of claim 1, said central antenna being a first central antenna; and, said motor vehicle further comprising a second central antenna mounted on said surface next to said first antenna and said second antenna likewise being connected to said central unit.

11. The motor vehicle of claim 10, said part being a fuel tank made of electrically insulating material and said first and second central antennas being mounted on said fuel tank.

12. The motor vehicle of claim 10, said each one of said tire-pressure control devices functioning to transmit said data to said central antenna as a high frequency signal; said second central antenna being mounted on said part so as to cause every point thereof to be at a distance from said first central antenna which corresponds to at least a quarter wavelength of said high frequency signal.

13. The motor vehicle of claim 12, said part being a fuel tank made of electrically insulating material and said first and second central antennas being mounted on said fuel tank.

14. The motor vehicle of claim 1, wherein said part of said fuel tank is that part thereof which has the shortest spacing to the ground on which the motor vehicle stands.

15. A motor vehicle having a tire-pressure control system, the motor vehicle comprising:

a part on the lower side of said vehicle and said part including a surface defined by an electrically insulating material;

a plurality of tires;

a plurality of tire-pressure control devices on corresponding ones of said tires for measuring the respective air pressures therein;

a central unit;

each one of said tire-pressure control devices functioning to contactlessly transmit data to said central unit and said data containing at least information as to the air pressure in the tire corresponding to said one of said tire-pressure control devices;

a central antenna for receiving the data transmitted by said tire-pressure control devices;

said central antenna being mounted on said surface;

said surface being disposed at a single location on said vehicle where there is a clear uninterrupted line-of-sight path between said central antenna and each of said plurality of tires so as to permit a direct transmission along said path from each of said tire-pressure control devices to said central antenna at said single location; and, said central antenna being in spaced relationship to said central unit and being connected to said central unit by an electric cable.

16. The motor vehicle of claim 15, said part being a fuel tank made of said electrically insulating material and said central antenna being mounted on said fuel tank.

17. The motor vehicle of claim 15, further comprising an electrically insulating foil; said central antenna being defined by an electrically conductive material impressed on said foil; and, said foil being attached to said surface.

18. The motor vehicle of claim 17, wherein said part is a fuel tank made of said electrically insulating material.

19. The motor vehicle of claim 15, said central antenna being surrounded by said electrically insulating material on all sides thereof.

20. The motor vehicle of claim 15, wherein said electric cable is a high frequency cable.

21. The motor vehicle of claim 20, said high frequency cable being a coaxial cable.

22. The motor vehicle of claim 20, said high frequency cable being a twisted-pair cable.

23. The motor vehicle of claim 15, each one of said tire-pressure control devices functioning to transmit said data to said central antenna at a high frequency signal; said motor vehicle further comprising a plurality of components made of electrically conductive material arranged adjacent to said part; and, said central antenna being mounted on said part so as to cause every point thereof to be at a distance from said components which corresponds to at least a quarter wavelength of said high frequency signal.

24. The motor vehicle of claim 15, said central antenna being a dipole antenna having two arms and each of said arms being sharply bent at at least one point thereof.

25. A motor vehicle having a tire-pressure control system, the motor vehicle comprising:

a fuel tank on the lower side of said vehicle and said fuel tank including a surface defined by an electrically insulating material;

a plurality of tires;

a plurality of tire-pressure control devices corresponding to respective ones of said tires for measuring the respective air pressures therein;

a central unit;

each one of said tire-pressure control devices functioning to contactlessly transmit data to said central unit and said data containing at least information as to the air pressure in the tire corresponding to said one of said tire-pressure control devices;

a central antenna for receiving the data transmitted by said tire-pressure control devices;

said central antenna being connected to said central unit and being mounted on said surface;

said central antenna being a first central antenna; and, a second central antenna mounted on said surface next to said first antenna and said second antenna likewise being connected to said central unit.

26. The motor vehicle of claim 25, said fuel tank being made of electrically insulating material and said central antenna being mounted on said fuel tank; said surface being disposed at a single location on said vehicle where there is a clear uninterrupted line-of-sight path between said central antenna and each of said plurality of tires so as to permit a direct transmission along said path from each of said tire-pressure control devices to said central antenna at said single location; and, said central antenna being in spaced relationship to said central unit and being connected to said central unit by an electric cable.

* * * * *